United States Patent [19]
Gattenby

[11] 3,897,970
[45] Aug. 5, 1975

[54] INFLATABLE, DETACHABLE GAP FILLER FOR CAMPER CAPS

[76] Inventor: Herbert H. Gattenby, Rt. 28, R.F.D. 3, Derry, N.H. 03038

[22] Filed: Sept. 4, 1973

[21] Appl. No.: 393,724

[52] U.S. Cl. ............................ 296/23 MC; 105/18
[51] Int. Cl.² .......................................... B60P 3/32
[58] Field of Search ............ 296/23 MC; 105/18, 20

[56] References Cited
UNITED STATES PATENTS

| | | |
|---|---|---|
| 3,303,615 | 2/1967 | O'Neal ...................... 296/23 MC X |
| 3,321,234 | 5/1967 | Harrell et al. .................. 296/23 MC |
| 3,410,226 | 11/1968 | Krupp ............................... 105/18 X |
| 3,586,119 | 6/1971 | Chuchua et al. .......... 296/23 MC X |
| 3,638,991 | 2/1972 | Hathaway ...................... 296/23 MC |
| 3,729,224 | 4/1973 | Hathaway ...................... 296/23 MC |

*Primary Examiner*—Albert J. Makay
*Assistant Examiner*—Leslie J. Paperner
*Attorney, Agent, or Firm*—Pearson & Pearson

[57] ABSTRACT

A flexible, resilient, soft material inflatable filler is tapered and flat-sided with corner beading to firmly and frictionally lodge between cab wall and cap wall while extending around the cab window and camper cap window to enable vision therethrough while preventing accumulation of snow or leaves in the gap. The filler is of inverted U-shape, and generally quadrangular in cross section, and entirely fills the gap. It is self-supporting when inflated for easy insertion in, and withdrawal from the gap, held in place by full inflation to the desired pressure, but foldable into a compact package when deflated, the seal extends fully across the gap from one side of the cab and cap to the other side thereof.

1 Claim, 6 Drawing Figures

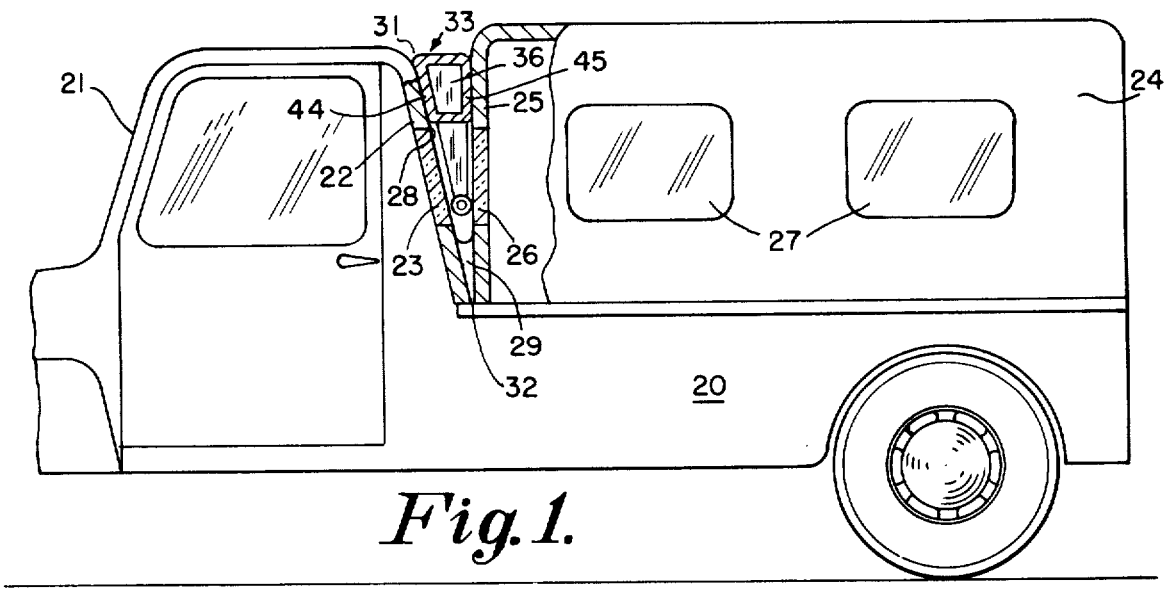
Fig. 1.
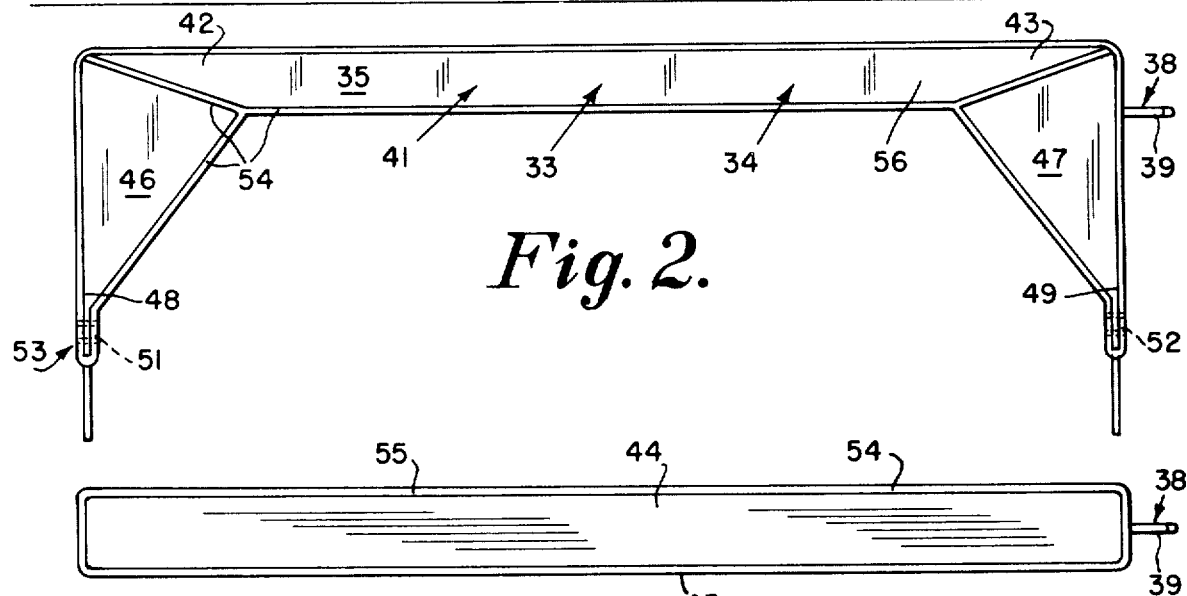
Fig. 2.
Fig. 3.
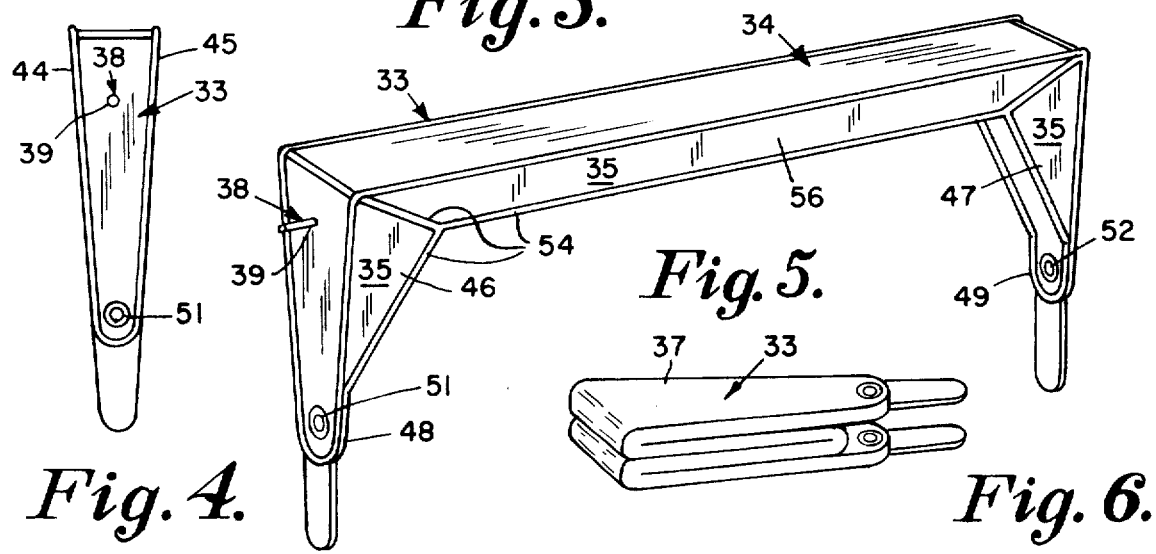
Fig. 4.  Fig. 5.  Fig. 6.

INFLATABLE, DETACHABLE GAP FILLER FOR CAMPER CAPS

BACKGROUND OF THE INVENTION

It has long been known to provide a bellows or accordion, type seal around the doorway of adjoining railroad cars to seal against admission of air while enabling articulation of the train. Such devices are disclosed in U.S. Pat. Nos. 2,568,684 to Mihalyi of Sept. 18, 1951, and 2,843,417 to Wahl of July 15, 1958. A similar flexible bellows, or accordion, sleeve of closed loop configuration is shown surrounding the cab door and camper door in U.S. Pat. No. 3,638,991 to Hathaway of Feb. 1, 1972. All of these devices are permanently installed on one unit or the other by bolts or other securing means and in the Hathaway device the sponge rubber sleeve is not self-supporting but requires wood fillers to mould its shape.

In U.S Pat. No. 3,321,234 to Harrell of May 23, 1967, a camper similar to that in the Hathaway patent is provided with a flexible boot, or sleeve, of cylindrical or rectangular cross section to constitute a sylphon-like tubular connection between the windows of camper and cap. It also is not self-supporting since it is made of rubberized vinyl such as used in convertible automobile tops.

The above mentioned devices of the prior art have the disadvantage that they must be attached to both front and rear walls to prevent collapse or dislodgment and are not self-supporting for easy sliding insertion into the gap between cab and camper by one person from one side of the vehicle.

Another foam rubber type tubular seal now on the market for sealing cab and camper suffers from the same disadvantages, in that it is difficult to emplace from one side, cannot be firmly lodged and tends to pop out of place at high speed due to wind pressures and other road or weather hazards.

SUMMARY OF THE INVENTION

In this invention, the filler is of inverted U configuration and is intended to fit between the rear wall of the cab of a pick-up truck and the front wall of what is known as a camper cap. Such caps do not extend over the cab as shown in the above mentioned patents and therefore the gap between cab and cap is not protected from the elements by an overhead extension. Thus, the sealing of the gap against accumulation of trash, snow, leaves, etc. is more important and the filler must be more firmly anchored while remaining low cost and simple because used with a relatively low cost cap. The inverted U-shaped filler of the invention is of soft, resilient, air impervious, rubber like material inflatable from a folded, flat, compact package to a self-supporting, semi-rigid body capable of being inserted by one man from one side of a vehicle into the cap-cab gap gap, to entirely fill the gap after the cap and cab are juxtaposed. It is tapered and of quadrangular cross section with flat walls which firmly engage the corresponding walls of cap and cab when further inflated to seal around the windows while not interfering with vision therethrough.

Corner beads are provided for further frictional contact and an aperture is provided in the tapered lower terminal tips of the seal to permit anchoring by ropes if necessary.

BRIEF DESCRIPTION OF THE DRAWING

FIG. 1 is a side elevational view of a typical pick-up truck and camper cap with a filler of the invention inflated in the gap, parts being in section;

FIG. 2 is a front elevation;

FIG. 3 is a top plan view;

FIG. 4 is an end elevation;

FIG. 5 is a perspective view of the filler of the invention; and

FIG. 6 is a perspective view of the device folded into a compact package.

DESCRIPTION OF A PREFERRED EMBODIMENT

As shown in the drawings, a pick-up truck 20, having a cab 21 with a rear wall 22 and rear window 23, is equipped with a camper cap 24 which converts the truck into an enclosed rear unit in which the occupants can sleep and eat. The cap 24 is provided with a forward wall 25 having a window 26 aligned with cab window 23, so that the driver has through vision into the cap and through the rear window of the cap. Cap 24 may have side windows 27 and, as is well known, the cap 24 may be easily installed or anchored on and removed from the truck so that the truck may be used for its normal purpose without the cap. Often there is a projecting flange, or drip gutter, 28 around either cab window 23 or cap window 26, and it should be noted that the rear wall 22 and forward wall 25 form a tapered gap 29 which diminishes in width from top 31 to bottom 32.

The filler 33 of the invention includes an inverted U-shaped body 34 of soft, resilient, air impervious material 35, such as rubber or rubberized fabric. The body 34 is hollow and air sealed to form an interior inflation chamber 36 and when deflated becomes a flat, compact, folded package 37, as shown in FIG. 6, which is easily stored and shipped.

Air pressure means 38 consisting of an air pressure valve and tube 39 is connected to the chamber 36 so that the filler 33 may be inflated to become self-supporting and semi-rigid as shown in FIGS. 1–5. When so inflated to a selected pressure, the body 34 includes an upper, horizontally extending portion 41 having opposite ends 42 and 43 and adapted to extend across gap 29 proximate the top 31 thereof and above the level of flange 28 and windows 23 and 26, to entirely fill the gap. The upper portion 41 is of uniform, symmetrical cross section which is preferably quadrangular when inflated so as to form opposite, upstanding forward and rearward walls 44 and 45 arranged to flatwise engage against the corresponding walls 22 and 25.

A pair of integral hollow inflatable side portions 46 and 47 are provided, each depending downwardly from one of the opposite ends 42 and 43 of body 34. Each side portion is of quadrangular and diminishing cross section from top 31 to bottom 32 with terminal tips 48 and 49, each with an aperture 51 or 52 for receiving ropes or wires and constituting anchoring means 53.

The upper portion 41 is generally trapezoidal in configuration and the side portions 46 and 47 are generally triangular in configuration, as can be best seen by the presence of the enlarged beading 54 extending along the peripheral corner edges 55 of the body and which increases the frictional contact of the seal in the walls of the gap.

In operation, the filler 34 may be unfolded from its deflated package condition of FIG. 6 and partially inflated through valve 39 by mouth or power means until it is erected into a self-supporting, inverted U-shaped body, as in FIG. 2. It may then be placed in position in gap 29 and carefully oriented by one man, despite the presence of flange 28, at the best height and location. It may then be further inflated until the beading 54 and friction surface 56 of the body side walls are firmly seated and locked in position against inadvertent dislodgment. If desired, as an additional precaution, the apertures 51 and 52 may be used to anchor the filler in place with ropes. The tight inflated engagment of the inflatable filler not only prevents accumulation in the gap while enabling vision through the windows, but also serves a streamlining function in reducing sound, whistling and the like at high high speed and shielding the front wall of the camper cap from abrupt confrontation with the air stream. There is little possibility of the filler flying out of the gap into the path of a following vehicle when tightly inflated, but it can be purposefully removed quickly and easily by deflation through the valve 39.

I claim:
1. In combination with a pick-up truck having a cab with a windowed rear wall and a camper cap with a windowed front wall, said windowed front wall being spaced by a predetermined gap from said windowed rear wall;
   an inflatable filler, or seal, of soft, resilient, air impervious material normally folded into a flat, compact package,
   said filler being partially inflatable, and erectable, into self supporting inverted, U-shaped configuration with an upper portion extending from one side of said cap and cab to the other, above said window and with a pair of integral tapered side portions, each extending down along one of the opposite sides of said windows;
   said upper and side portions being of hollow quadrangular cross section and having flat forward and rearward walls with enlarged beads extending peripherally therearound;
   air tube and valve means in one said side portion for enabling full inflation of said filler to detachably lodge the same in said gap in frictional contact with said cab and cap walls, but to permit dislodgment by deflation for folding the same into said package.

* * * * *